S. J. CLULEE.
EYEGLASSES.
APPLICATION FILED AUG. 8, 1916.

1,282,759.

Patented Oct. 29, 1918.

INVENTOR
Stephen J. Clulee
BY
Emery, Booth, Janney & Varney
ATTORNEYS

UNITED STATES PATENT OFFICE.

STEPHEN J. CLULEE, OF ATTLEBORO, MASSACHUSETTS.

EYEGLASSES.

1,282,759.  Specification of Letters Patent.  Patented Oct. 29, 1918.

Application filed August 3, 1916. Serial No. 113,738.

*To all whom it may concern:*

Be it known that I, STEPHEN J. CLULEE, a citizen of the United States, and a resident of Attleboro, in the county of Bristol and State of Massachusetts, have invented an Improvement in Eyeglasses, of which the following is a specification.

This invention relates to eyeglasses and an art of making the same and deals more particularly with eyeglasses having celluloid rims. One of the objects thereof is to provide a practical eyeglass frame of simple and durable construction. Another object is to provide an eyeglass frame which can be conveniently formed and easily manipulated and in which the parts are securely held together. Another object is to provide a practical and convenient art for attaching parts to eyeglass rims. Other objects will be in part obvious and in part pointed out hereinafter.

The invention accordingly consists in the features of construction, combinations of elements, arrangement of parts and in the several steps and relation thereof as will be hereinafter illustratively set forth, and the scope of the application of which will be indicated in the following claims In the accompanying drawing, in which is shown one or more of various possible embodiments of several features of this invention, Figure 1 is a front view of the portion of an eyeglass;

Similar reference characters refer to similar parts throughout the several views of the drawing.

Figure 1:
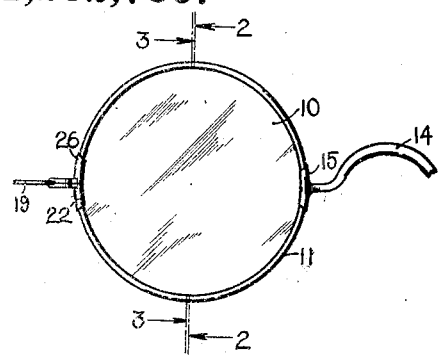
Figure 2:
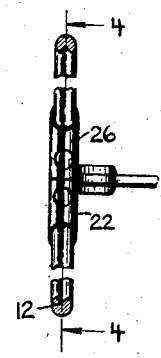
Fig. 2 is a sectional view along the line 2—2 of Fig. 1, as indicated by the arrows.

Referring now to Fig. 1 of the drawings there is shown at 10 an eyeglass lens surrounded by a rim 11 preferably formed of celluloid, although certain features of this invention may be embodied or carried on in connection with eyeglasses having rims of different material. It may here be noted that the term "eyeglass" is broadly used to comprehend any device for mounting lenses before the eye whether supported entirely by the nose of the wearer or of the so-called spectacle form. Also the term "celluloid" is broadly used to comprehend any equivalent material.

The celluloid rim 11 may be of any desired contour and is preferably grooved as at 12 about its inner surface to embrace the edge of the lens 10. The rim is not continuous in the sense of being integral throughout but is preferably cut through as on the line 13 of Fig. 4 of the drawings. The ends are relatively separable at this point and permit the rim to be sprung apart when it is snapped over the eyeglass lens, the resilient nature of the material tending to snap it back into position.

At the bridge side of the rim a bridge 14 is secured in position by means of a sleeve 15 rigidly secured to the bridge. This sleeve is connected with the rim as follows: The ends of the rim member 11 being slightly separated, the sleeve of the bridge in tubular form is slipped about the rim and slid into a position substantially opposite the cut 13. Member 15 at this stage is in substantially circular form as regards its cross section and fits snugly about the rounded outer contour of the rim member. The member 15 moreover is elongated in a circumferential direction as indicated at 16 with respect to the circumferential length of its inner portion. The inner portion moreover is provided with an opening 17 extending entirely through the sheet metal of which the sleeve is formed. When the sleeve is properly positioned, pressure is by suitable means applied to its inner surface outwardly toward the groove 12 formed in the rim. This pressure which may reach a high value results in a material contraction of all diameters of the sleeve, thus gripping the celluloid rim with great force. The pressure moreover is so applied that the inner portions of the sleeve are actually forced outwardly into the material of the rim, thus resulting in the latter flowing upwardly or inwardly into the opening 17, as indicated at 18 until it is flush with the exposed surface of the metal. The circumferentially elongated outer portion of the sleeve gives it a far greater area than the inner portion about the opening 17 and hence there is no tendency of the latter to be drawn into the rim and thus weaken the celluloid member.

Figure 4:
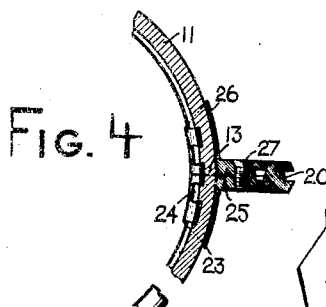
Fig. 4 is a sectional view along the line 4—4 of Fig. 2.
Figure 6:
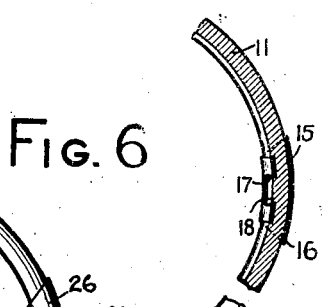
Fig. 6 is a detailed front elevation of the parts shown in Fig. 4, the same appearing on a larger scale and in separated relation.
Figure 5:
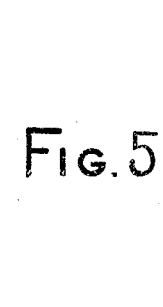
Fig. 5 is a sectional view along the line 5—5 of Fig. 3.
Figure 9:
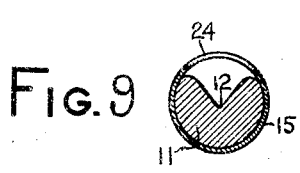
Fig. 9 is a diagrammatic sectional view showing the parts at a certain stage in their making.
Figure 10:
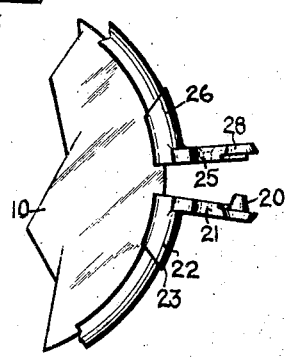
Fig. 10 is a similar view showing the same parts at a later stage

At the side of the rim remote from the bridge 14 the temple bar 19 of the spectacles is pivoted on the pin 20 of a connecting clip 21. This clip is preferably formed integral with or brazed to a sleeve 22 elongated on its outer side as at 23 and provided on its inner surface with an opening 24. The mating member 25 is secured by a substantially identical sleeve 26 to the remaining end of the rib member 11 and these parts when the lens is inserted are releasably secured together by means of a screw 27 as shown in Fig. 4 of the drawing. The member 25 is extended outwardly as at 28 to fit over the end of the pin 20 and thus securely lock the perforated end of the temple bar 19 upon this pin as a pivot.

Each of the sleeves 26 and 22 is, after being slipped over the corresponding ends of the rim member 11 while in circular form, subjected to the same pressure as was described in connection with the sleeve member 15 and they are thus so securely locked in position as to preclude the chance of their detachment from the rim. This locking action moreover is gained without the use of separable parts and without weakening the celluloid rim member.

With the completed device the lens is easily inserted or removed merely by the removing of the screw 27, thus permitting the effective diameter rim to be enlarged as it is snapped over the lens. The latter moreover is securely held, for the parts may be so proportioned that after the lens is inserted the rim is contracted about its edge with any desired degree of force. In this manner slight variations in the circumference of the lens do not affect the fit of the rim and there is no tendency to deform or break the rim in inserting the lens by merely stretching the celluloid.

Figure 3:
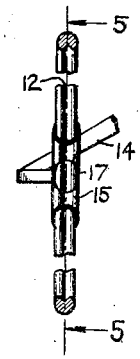
Fig. 3 is a sectional view along the line 3—3 of Fig. 1.
Figure 7:
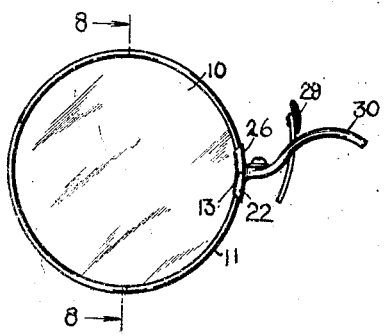
Fig. 7 is a front elevation of an eyeglass of the form mounted on the nose.
Figure 8:
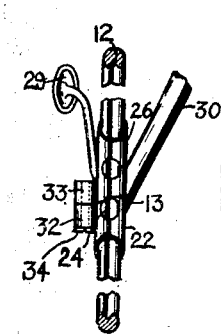
Fig. 8 is a sectional view along the line 8—8 of Fig. 7. the same appearing on a larger scale.

In the form of eyeglasses shown in Figs. 7 and 8 of the drawing the point 13 at which the ends of the celluloid rim member 11 meet is at the bridge end of the lens or the side adjacent the nose in use. There is here shown a form of eyeglasses which is supported on the nose as by the well-known spring pressed swinging nose guard 29 upon the bridge 30. Formed on the bridge 30 beyond the pivot 31 and the guard arm 29 is a sleeve 22 substantially identical in construction and action with the corresponding part in the device shown in Fig. 3 of the drawing. Co-acting with this sleeve 22 is a sleeve 26 in analogy to the sleeve 26 hereinbefore described and these sleeves as best shown in Fig. 8 of the drawing are respectively provided with the tubular extensions 32 and 33 normally positioned substantially in alinement and separably held together as by the screw 34.

It will be thus seen that there is provided a device and an art in which the several objects of this invention are achieved and that the advantages hereinbefore noted are gained among others which it is unnecessary to point out.

As various possible changes might be made in the above construction and as apparent variations might be made in the method of carrying on the above art, it is to be understood that all matter herein set forth or shown on the accompanying drawing is to be interpreted as illustrative and not in the limiting sense.

I claim as my invention:

1. In eyeglass construction, in combination an eyeglass rim having separable ends and a device comprising a sleeve into which said rim is inserted and embraced thereby, said sleeve extending continuously about the member of which said rim is formed.

2. In eyeglass construction, in combination, a grooved celluloid rim member having its ends resting adjacent each other, and a metallic sleeve through which said celluloid member is inserted, the inner and outer portions of said sleeve being inseparable one from the other and the inner portion thereof being depressed into said groove and into interlocking relation with the bottom surface of said groove.

3. In eyeglass construction, in combination, a rim member formed of celluloid, and a metallic member embracing said rim member and interlocking therewith against circumferential movement with respect to the rim.

4. In eyeglass construction, in combination, a celluloid rim member, and a metallic member extending entirely about said first member and provided with a perforation in its inner surface, the celluloid of said first member being forced into said perforation to lock said second member in position.

5. In eyeglass construction, in combination, a grooved rim member having separable ends, and a sleeve through which said rim member is inserted, said sleeve fitting said groove and being forced into interlocking relation with each end of said rim member within said groove to hold it against circumferential movement with respect thereto.

6. In eyeglass construction, in combination, a grooved rim member formed of celluloid, and an integral metallic tube fitted about a portion of said rim member and into said groove and forced outwardly into interlocking relation with the walls of said groove.

7. In eyeglass construction, in combination, a rim member formed of celluloid, and an integral metallic tube fitted about a portion of said rim member and forced outwardly into interlocking relation thereto, said rim member being formed of celluloid and said metallic member being provided with a perforation in its inner portion.

8. In eyeglass construction, in combination, a rim member formed of celluloid having its ends separable, a pair of metallic devices respectively embracing and interlocking with the ends of said rim member and means adapted to secure said devices one to another.

9. In eyeglass construction, in combination, a celluloid rim member having separable ends, a pair of integral tubular metallic members into which said ends are respectively inserted, and means adapted separably to secure said last members one to another.

10. In eyeglass construction, in combination, a celluloid rim member having separable ends, a pair of metallic members with which said ends respectively interlock, a swinging member pivotally connected with one of said metallic members, and means adapted to secure said metallic members one to another.

11. In eyeglass construction, in combination, a celluloid rim member having its ends lying adjacent one another, a pair of metallic sleeves respectively fitted over said ends and extending continually about said end portions, said sleeves being forced into interlocking relation with the inner surfaces of said end portions, and means adapted separably to secure said sleeves one to another.

12. In eyeglass construction, in combination, a celluloid rim member having a groove extending circumferentially about its inner surface, and a tubular metallic member extending about a portion of said rim having its inner portion inseparable from its outer portion and forced into interlocking relation with said groove of said celluloid member.

13. An art of the character described, which comprises inserting an interiorly grooved rim member within a tubular member and forcing the inner portion of said tubular member into the groove of said first member and thus tighten the outer portion of said tube about said first member.

14. An art of the character described which comprises inserting an interiorly grooved celluloid member within a metallic sleeve into a position in which said rim is surrounded by said sleeve and forcing the inner portion of said sleeve into said groove to such an extent as to embed portions of said sleeve into the walls of said groove.

15. An art of the character described which comprises inserting a celluloid rim member within a continuous metallic sleeve and tightening said sleeve about said member by applying a greater intensity of pressure on its inside than on its outside portions.

16. An art of the character described which comprises inserting an interiorly grooved celluloid rim member into a metallic sleeve and tightening said sleeve about said rim member by applying a greater intensity of pressure upon its inside than upon its outside surfaces and increasing said inside pressure until the inner portions of said sleeves embed into the walls of the groove of said first member.

In testimony whereof, I have signed my name to this specification this fourth day of August, 1916.

STEPHEN J. CLULEE.